Patented Nov. 13, 1951

2,575,238

UNITED STATES PATENT OFFICE 2,575,238

TREATMENT OF CAUSTIC SODA CELL LIQUOR

Vernon A. Stenger, Midland, Mich., assignor to The Dow Chemical Company, Midland, Mich., a corporation of Delaware No Drawing. Application August 2, 1948, Serial No. 42,139

5 Claims. (Cl. 23—184)

The invention relates to methods of purifying caustic soda solutions. It more particularly concerns an improved method of treating the caustic liquor produced in a conventional diaphragm electrolytic cell on electrolyzing therein a sodium chloride solution.

Electrolytic caustic soda liquor produced from diaphragm cells, generally as an aqueous solution containing from about 5 to 15 per cent of NaOH or usually about 10 per cent of NaOH, and which is sometimes concentrated moderately to about 25 per cent, develops color during evaporation to higher concentrations. The color ranges from pink in approximately 35 per cent NaOH to purple or blue at 50 per cent. According to Harold H. Heller, reporting in the Transactions of the Electrochemical Society, vol. 87, 1945, pages 501 to 510, the color is due to a crystalline organic compound having the empirical formula $C_{10}H_5O_9Cl$. Because the color is objectionable in the product, various methods of eliminating it have been suggested. For example, bleaching with sodium hypochlorite has been used but not with complete satisfaction because a green or yellow color results from slight overbleaching, and it is difficult to obtain a colorless product by such bleaching. Another method is to subject the liquor to a prolonged heating, but it is hard on equipment and consumes extra fuel. Insofar as I am aware, there is no satisfactory method of treating caustic soda cell effluent before subjecting it to evaporation so as to obtain a concentrated color-free liquor.

The principal object of the invention is to provide an efficient and easily applied method of removal of the color-forming principle of caustic soda cell effluent so that the same may be concentrated thereafter by evaporation to yield a color-free product. Other objects and advantages will appear as the description proceeds.

I have discovered that the foregoing and related objects are attained by treating the cell effluent containing a small concentration of sulfate with an amount of either barium oxide, hydroxide, or chloride sufficient to precipitate all the sulfate, as well as carbonate if present, and provide a concentration of about 0.1 to 0.4 per cent of barium ion in the effluent, or preferably about 0.2 to 0.3 per cent. After adding the barium compound there results a coprecipitation of the color-forming principle with the barium sulfate (and barium carbonate if present). The precipitate is separated from the solution, which may be treated for the removal of unprecipitated barium prior to evaporation or evaporated directly to a colorless concentrated product. The invention then consists of the method hereinafter described and particularly pointed out in the claims.

In carrying out the invention, the caustic liquor may be treated as it comes from the electrolytic cell, usually in a concentration of about 10 per cent of NaOH by weight, the balance being water and salt (8–15 per cent usually) except for incidental impurities. The cell liquor is usually moderately hot (45–60° C.) as produced and this is an advantage, although the effluent may be treated at room temperature. There must be present in the cell effluent a small concentration of sulfate such as about 0.1 to 0.4 per cent of $SO_4$ by weight, approximately 0.3 per cent being generally suitable. Normally, sufficient sulfate is naturally present as an impurity, sometimes in concentrations as high as 2 or 3 per cent, and additional sulfate usually need not be added. Also, a small concentration of carbonate is usually present. As both the sulfate and carbonate, if any, are to be precipitated in carrying out the method, as well as the color-forming principle, sufficient soluble barium compound as barium oxide, hydroxide, or chloride (either hydrated or anhydrous) is added to the cell effluent to be stoichiometrically equivalent to the sulfate and carbonate present and to provide about 0.2 to 0.3 per cent by weight of barium ion in excess of that needed for the sulfate and carbonate precipitation. The addition to the cell effluent of the soluble barium compound is preferably carried out by first dissolving the requisite amount of barium compound in water to form a solution thereof and then mixing the solution with the cell effluent. It is desirable to agitate the mixture for a few minutes to insure completeness of precipitation. The resulting precipitate is separated from the solution in any convenient manner, as by filtration through an asbestos filter or settling and decantation. The solution thus separated from the precipitate is ready for concentration in the usual manner and yields a color-free caustic soda. However, for most purposes it is desirable to treat the separated solution before evaporation to remove unprecipitated barium. This may be accomplished most conveniently by adding to the separated solution the stoichiometrically equivalent amount of a soluble carbonate or sulfate, preferably sodium carbonate or sulfate dissolved in water. The two solutions are mixed and the resulting precipitate is separated, as by filtration, thereby obtaining a substantially barium-free caustic liquor suitable for concentrating as desired by the evaporation therefrom of water, thereby obtaining a color-free caustic soda product.

The following examples are illustrative of the method:

Example 1

400 grams of cell effluent containing about 10 per cent by weight of NaOH, 0.3 per cent of $Na_2SO_4$, about 10 per cent of NaCl, the balance being substantially all water, was mixed with a hot solution in 10 milliliters of water of 1.4 grams of BaO and 1.0 gram of $BaCl_2 \cdot 2H_2O$. The mixture was stirred well and the resulting precipitate allowed to settle for about 20 minutes, after which the mixture was filtered to separate the solution from the precipitate. The filtered solution thus obtained was treated with 0.55 gram of sodium carbonate, added as a nearly saturated water solution, thereby precipitating out the excess barium ion as barium carbonate. After allowing the mixture to stand for several hours, the barium carbonate was removed by filtration, and the filtrate was evaporated in a vacuum of 25 to 27 inches of mercury to a concentration of about 50 per cent NaOH. During the evaporation, salt which crystallized out was removed in two stages, one when the concentration of the NaOH reached 35 per cent, the other at 50 per cent NaOH concentration. The concentrated product was colorless.

Example 2

A similar procedure was followed to that of Example 1 using barium chloride in place of the barium oxide, the total amount used being 3.2 grams $BaCl_2 \cdot 2H_2O$. The resulting concentrated caustic soda solution was colorless.

In comparison with the foregoing examples, a 400-gram sample of the same cell effluent was untreated but filtered and then concentrated in similar manner to that in the examples. The resulting concentrated (50 per cent NaOH) caustic soda solution was colored purplish-pink.

I claim:

1. The method of producing an uncolored concentrated caustic soda liquor by evaporation of water from caustic soda diaphragm cell effluent containing not over 25 per cent of NaOH by weight and an alkali metal sulfate in a concentration of about 0.1 to 0.4 per cent in terms of $SO_4$, which comprises adding to the cell effluent in aqueous solution a soluble barium compound selected from the group consisting of barium oxide, barium hydroxide, and barium chloride, in amount sufficient to precipitate the sulfate as barium sulfate and produce a barium ion concentration of 0.1 gram to 0.4 gram per 100 grams of effluent, separating the resulting precipitate from the so-treated cell effluent, and concentrating the separated cell effluent beyond 25 per cent of NaOH by weight.

2. The method of producing an uncolored concentrated caustic soda liquor by evaporation of water from caustic soda diaphragm cell effluent containing not over 25 per cent of NaOH by weight and an alkali metal sulfate in a concentration of about 0.1 to 0.4 per cent in terms of $SO_4$, which comprises adding to the cell effluent in aqueous solution barium oxide in amount sufficient to precipitate the sulfate as barium sulfate and produce a barium ion concentration of about 0.2 to 0.3 gram per 100 grams of effluent, separating the resulting precipitate from the so-treated cell effluent, and concentrating the separated cell effluent beyond 25 per cent of NaOH by weight.

3. The method of producing an uncolored concentrated caustic soda liquor by evaporation of water from caustic soda diaphragm cell effluent containing not over 25 per cent of NaOH by weight and an alkali metal sulfate in a concentration of about 0.1 to 0.4 per cent in terms of $SO_4$, which comprises adding to the cell effluent in aqueous solution barium hydroxide in amount sufficient to precipitate the sulfate as barium sulfate and produce a barium ion concentration of about 0.2 to 0.3 gram per 100 grams of effluent, separating the resulting precipitate from the so-treated cell effluent, and concentrating the separated cell effluent beyond 25 per cent of NaOH by weight.

4. The method of producing an uncolored concentrated caustic soda liquor by evaporation of water from caustic soda diaphragm cell effluent containing not over 25 per cent of NaOH by weight and an alkali metal sulfate in a concentration of about 0.1 to 0.4 per cent in terms of $SO_4$, which comprises adding to the cell effluent in aqueous solution barium chloride in amount sufficient to precipitate the sulfate as barium sulfate and produce a barium ion concentration of about 0.2 to 0.3 gram per 100 grams of effluent, separating the resulting precipitate from the so-treated cell effluent, and concentrating the separated cell effluent beyond 25 per cent of NaOH by weight.

5. The method of producing an uncolored concentrated caustic soda liquor by evaporation of water from caustic soda diaphragm cell effluent containing not over 25 per cent of NaOH by weight and an alkali metal sulfate in a concentration of about 0.1 to 0.4 per cent in terms of $SO_4$, which comprises adding to the cell effluent in aqueous solution a soluble barium compound selected from the group consisting of barium oxide, barium hydroxide, and barium chloride, in amount sufficient to precipitate the sulfate as barium sulfate and produce a barium ion concentration of about 0.2 to 0.3 gram per 100 grams of effluent, separating the resulting precipitate from the so-treated cell effluent, precipitating the remaining barium ion by adding the stoichiometrically equivalent amount of sodium carbonate, separating the resulting barium carbonate precipitate from the solution, and concentrating the separated cell effluent beyond 25 per cent at NaOH by weight.

VERNON A. STENGER.

REFERENCES CITED

The following references are of record in the file of this patent:

UNITED STATES PATENTS

| Number | Name | Date |
|---|---|---|
| 2,003,734 | Broadhurst | June 4, 1935 |
| 2,132,585 | Spittle | Oct. 11, 1938 |
| 2,207,566 | Waldeck | July 9, 1940 |
| 2,262,246 | Muskat | Nov. 11, 1941 |

FOREIGN PATENTS

| Number | Country | Date |
|---|---|---|
| 414,497 | Great Britain | Aug. 9, 1934 |

OTHER REFERENCES

"Modern Inorganic Chemistry," by J. W. Mellor, page 537, 1935 Ed., Longmans, Green & Co., N. Y., publishers.